United States Patent
Sunder et al.

(10) Patent No.: US 6,822,068 B2
(45) Date of Patent: Nov. 23, 2004

(54) METHOD FOR PRODUCING HIGHLY-BRANCHED GLYCIDOL-BASED POLYOLS

(75) Inventors: Alexander Sunder, Köln (DE); Rolf Mülhaupt, Freiburg (DE)

(73) Assignee: Bayer Aktiengesellschaft, Leverkusen (DE)

( * ) Notice: Subject to any disclaimer, the term of this patent is extended or adjusted under 35 U.S.C. 154(b) by 50 days.

(21) Appl. No.: 10/335,667

(22) Filed: Jan. 2, 2003

(65) Prior Publication Data

US 2003/0092879 A1 May 15, 2003

Related U.S. Application Data

(62) Division of application No. 09/868,557, filed on Jun. 19, 2001, now abandoned.

(30) Foreign Application Priority Data

| Dec. 22, 1998 | (DE) | ................ 198 59 300 |
| Oct. 4, 1999 | (DE) | ................ 199 47 631 |

(51) Int. Cl.$^7$ ............ C08G 65/28; C08G 65/331; C08L 75/04
(52) U.S. Cl. ............ 528/409; 525/454; 528/413; 528/421
(58) Field of Search ............ 528/413, 421, 528/409; 525/454

(56) References Cited

U.S. PATENT DOCUMENTS 3,945,894 A * 3/1976 Martin et al. ............ 205/311

FOREIGN PATENT DOCUMENTS

| DE | 3233251 | 3/1984 |
| EP | 0 116 978 | 8/1984 |
| EP | 116978 A2 * | 8/1984 |
| JP | 58-198429 | 11/1983 |
| JP | 61-43627 | 3/1986 |

OTHER PUBLICATIONS

Dworak et al., "Cationic polymerization of glycidol. Polymer structure and polymerization mechanism," Macromolecular Chemistry and Physics, vol. 196 (1995), pp. 1963–1970.*
**Dworak A: "Cationic Polymerisation of Glycidol", International Polymer Science and Technology, GB Rapra Technologies, Shropshire, Dv. 22, Nr. 11, Nov. 1, 1995, XP000583789.
**Patent Abstracts of Japan, vol. 1998, No. 01, Jan. 30, 1998, & JP 09 235246 A (Lion Corp), Sep. 9, 1997.

* cited by examiner

Primary Examiner—Robert Sellers
(74) Attorney, Agent, or Firm—Joseph C. Gil; N. Denise Brown

(57) ABSTRACT

This invention relates to a process for the preparation of highly-branched polyols by polymerisation of glycidol in the presence of a hydrogen-active starter compound with basic catalysis, wherein glycidol is added in dilute solution and the solvent used for the dilution is continuously distilled off. The polyols thus prepared are colorless, contain as the core unit solely the starter compound used and have polydispersities of less than 1.7. The present invention also relates to polyols that comprise the reaction product of the polyols based on glycidol with one or more expoxide monomers. This invention also relates to a process for the preparation of these polyols.

6 Claims, No Drawings

METHOD FOR PRODUCING HIGHLY-BRANCHED GLYCIDOL-BASED POLYOLS

CROSS-REFERENCE TO RELATED APPLICATIONS

This application is a divisional of U.S. application Ser. No. 09/868,557 filed on Jun. 19, 2001, now abandoned.

BACKGROUND OF THE INVENTION

This invention relates to a process for the preparation of highly-branched polyols by polymerisation of glycidol in the presence of a hydrogen-active starter compound with basic catalysis.

Branched polyols based on glycidol are conventionally prepared by reacting glycidol with a hydroxyl-containing compound, for example, glycerol, in the presence of inorganic (JP-A 61-43627) or organic (JP-A 58-198429) acids as catalysts. The polymers thus obtained generally have a low degree of polymerisation. The polymerisation of glycidol to products of higher molecular weight which have a narrow molar-mass distribution and complete incorporation of initiators cannot be achieved by cationic catalysis, because of the competing cyclisation reactions (Macromolecules, 27 (1994) 320; Macromol Chem. Phys. 196 (1995) 1963). Existing processes using basic catalysis (EP-A 116 978; J. Polym. Sci., 23(4) (1985) 915), likewise do not lead to colourless products free of by-products and having a narrow molar-mass distribution and complete incorporation of initiators. A secondary reaction of significance here is in particular the cyclisation as a result of the autopolymerisation of glycidol.

SUMMARY OF THE INVENTION

Accordingly, the object of the present invention was to find a process for the preparation of highly-branched polyols based on glycidol whereby the problems described above are avoided.

Surprisingly, it has now been found that it is possible to prepare colourless, highly-branched polyols based on glycidol which are narrowly distributed and have a defined structure, if a dilute solution containing glycidol is added to a hydrogen-active starter compound, with basic catalysis, the solvent used for the dilution being continuously distilled off. In this connection, "defined structure" means that each molecule possesses the initiator (hydrogen-active starter compound) as the core unit and the degree of polymerisation can be controlled via the monomer/initiator ratio.

The invention provides a process for the preparation of highly-branched polyols based on glycidol which have a defined structure, which is characterised in that a dilute solution containing glycidol is added to a hydrogen-active starter compound, in the presence of a basic catalyst, the solvent used for the dilution of the monomer being continuously distilled off.

As a result of the preferential opening of the epoxide ring at the unsubstituted end where basic catalysis is used, a secondary alkoxide is first of all produced, which, however, in consequence of the basic catalysis, is in rapid exchange with the primary alkoxide. The rapid proton exchange equilibrium ensures that all hydroxyl groups present in the system are active as regards polymerisation and that there is a resulting development of branching.

DETAILED DESCRIPTION OF THE INVENTION

Compounds having molecular weights of from 18 to 4,000 and containing from 1 to 20 hydroxyl, thiol and/or amino groups are used as hydrogen-active starter compounds. Examples which may be given are: methanol, ethanol, butanol, phenol, ethylene glycol, diethylene glycol, triethylene glycol, polyethylene glycol, 1,2-propylene glycol, dipropylene glycol, polypropylene glycol, 1,4-butanediol, hexamethylene glycol, bisphenol A, trimethylolpropane, glycerol, pentaethritol, sorbitol, cane sugar, degraded starch, water, methylamine, ethylamine, propylamine, butylamine, stearylamine, aniline, benzylamine, o- and p-toluidine, a,β-naphthylalnine, ammonia, ethylenediarnine, propylenedianiine, 1,4-butylenediamone, 1,2-, 1,3-, 1,4-, 1,5- or 1,6-hexamethylenediamine, also o-, m- and p-phenylenediamine, 2,4-, 2,6-tolylenediamine, 2,2'-, 2,4- and 4,4'-diaminodiphenylmethane and diethylenediamine, as well as compounds which contain functionalisable starter groups, such as, for example, allyl glycerol, 10-undecenylamine, dibenzylamine, allyl alcohol, 10-undecenol. The starter compound is first of all partially deprotonated by a suitable reagent, for example, by alkali metals or alkaline-earth metals, their hydrides, alkoxides, hydroxides or alkyls. Preferably alkali metal hydroxides or alkoxides or alkaline-earth metal hydroxides or alkoxides are used, such as, for example, potassium hydroxide or methoxide. Any reactive, volatile reaction products (for example, water, alcohol) which may form in the course of this are removed (for example, by distillation). Degrees of deprotonation are generally 0.1% to 90% and preferably 5% to 20%. In order to avoid problems of intermixture in the course of the reaction, the basic initiator system thus prepared is dissolved or dispersed, preferably under inert gas (for example, $N_2$, Ar), in an inert solvent I (0.1 to 90 wt. %, based on the quantity of the end product) having a boiling point at least 5° C. above the reaction temperature. Solvent I can be an aliphatic, cycloaliphatic or aromatic hydrocarbon (for example, Decalin, toluene, xylene) or an ether (for example, glyme, diglyme, triglyme), preferably diglyme, as well as mixtures of these. The monomer is added in a solution, which generally contains 80 to 0.1 wt. % and preferably 50 to 1 wt. % glycidol in an inert solvent II. Solvent II can be an aliphatic, cycloaliphatic or aromatic hydrocarbon (for example, hexane, cyclohexane, benzene) or an ether (for example, diethyl ether, THF), preferably TBF, or a mixture of these, the boiling point being at least 1° C. below the reaction temperature. Solvent II can contain other additives, such as stabilisers and up to 10 wt. %, based on the solvent, of other comonomers such as, for example, propylene oxide, ethylene oxide, butylene oxide, vinyl oxirane, allyl glycidyl ether, isopropyl glycidyl ether, phenyl glycidyl ether. Solvent II must be a solvent for glycidol, but not necessarily for the polyol. The monomer solution is slowly added to the mixture of initiator and solvent I, preferably under inert gas (for example, $N_2$, Ar). The feed rate is so chosen as to ensure a good temperature control at the given reaction conditions of reaction temperature, glycidol concentration, hydroxyl and catalyst concentration. In the course of the reaction solvent II is continuously removed from the reaction mixture by distillation. Here the reaction temperatures are generally 40° C. to 180° C., preferably 80° C. to 140° C. The reaction is preferably carried out at normal pressure or reduced pressure. In the course of the reaction, depending on the choice of solvents I and II, the reaction mixture may become inhomogeneous. This does not influence the reaction, however, as long as no precipitation occurs. In order to work up the alkaline polymer, in principle all the known techniques for the working up of polyether polyols for applications in polyurethane chemistry may be used (H. R., Friedel, in Gum, W. F., Riese, W. (Editors): "Reaction Polymers", Hanser Verlag, Munich 1992, page 79). The polyol is worked up preferably by neutralisation. For this, the alkaline polymer can first of all be dissolved in a suitable solvent (for example, methanol). The neutralisation is preferably carried out by acidification with dilute mineral acid (for example, sulfiric acid) with subsequent filtration or treatment with adsorbent material (for example, magnesium silicate), particularly preferably by filtration through acidic ion-exchange material. This can be followed by a further purification by precipitation (for example, from methanol in acetone). Finally, the product is freed from traces of solvents under vacuum at temperatures of 20° C. to 200° C.

The polymerisation can be carried out in a system of reactors consisting of three essential components: a heatable reaction vessel with mechanical stirrer, a metering unit and a system for the removal of solvents.

The polyols thus prepared, which are the subject matter of the Application, have degrees of polymerisation (based on one active hydrogen atom of the initiator) of 1 to 300, preferably of 5 to 80. The molar mass of the polyols according to the invention can be controlled via the monomer/initiator ratio corresponding to the anionic process. The molar mass can be determined, for example, by vapour-pressure osmosis. The polydispersities are less than 1.7 and preferably less than 1.5. They are determined by means of a GPC calibrated, for example, with polypropylene glycol standards. The polyols contain as the core unit the initiator used, which can be detected preferably by MALDI-TOF mass spectrometry. The products are preferably colourless, but may also be pale yellowish in colour. The proportion of branched units in the highly-branched polyols, based on all of the monomeric structural units, can be determined from the intensity of the signals in the $^{13}$C-NMR spectrum. The triply substituted carbon atom of the branched units exhibits a resonance between 79.5 ppm and 80.5 ppm (measured in $d_4$-methanol, inverse-gated technique). The proportion of the branched units is equal to three times the value of this integral value in relation to the sum of the integrals of all signals of all units (branched, linear and terminal). The polyols prepared by the described process have 10 to 33 mol %, preferably 20 to 33 mol %, branched units. In comparison with this, a perfect dendrimer has 50 mol % branched and 50 mol % terminal units. A linear polymer, on the other hand, has no branched units and only linear units and, depending on the initiator, one to two terminal units. With 20 to 33 mol % branched units, the polyols described can therefore be termed highly-branched (see, for example, Acta Polymer., 48 (1997) 30; Acta Polymer., 48 (1997) 298.

The highly-branched polyols thus prepared are versatile highly functional polymeric intermediates. The great range of potential initiator molecules and the carefully calculated control of the degree of polymerisation (and hence the degree of functionalisation) opens up diverse possible applications, thus for example, use as cross-linking agents and additives in polyurethane formulations, in biocompatible polymers, in paints, adhesives and polymer blends, as support materials for catalysts and as active ingredients in medicine, biochemistry and synthesis.

In addition, derivatisations can be carried out through carefully calculated reactions of the functional groups.

By means of known per se reactions, the hydroxyl groups can, for example, be esterified, etherified, aminated, alkylated, urethanised, halogenated, sulfonated, sulfated and oxidised. The terminal 1,2-diol groups can, for example, be acetalated or ketalated or subjected to a diol cleavage.

Double bonds, which are introduced into the polyol, for example, via the starter compound, can likewise be derivatised in suitable form, for example, by hydroformulation or by radical or electrophilic addition.

The polyols derivatised in this way in turn open up a multitude of possible applications, thus, for example, use as cross-linking agents and additives in polyurethane formulations, in biocompatible polymers, in paints, adhesives and polymer blends, as support materials for catalysts and as active ingredients in medicine, biochemistry and synthesis, as reaction compartments for the catalysis and production of nanoparticles.

The highly-branched polyols prepared according to the invention can also be reacted with a second epoxide monomer (and optionally further epoxide monomers) such as, for example, propylene oxide, ethylene oxide, butylene oxide, vinyl oxirane, glycidol, ally glycidyl ether, to form block copolymers. Preferably ethylene oxide, propylene oxide, butylene oxide, vinyl oxirane and mixtures thereof are used. Preferably the highly-branched polyol is reacted, using basic catalysis, without intermediate working up and in the same reaction vessel, with the epoxide monomer/mixture of epoxide monomers, optionally with the addition of a solvent. A further deprotonation of the highly-branched polyol by means of the basic reagents described above may also take place. Degrees of deprotonation are generally 0.1% to 90% and preferably 5% to 20%, based on one OH group. The reaction temperatures here are between −40° C. and 200° C., preferably between 20° C. and 180° C., particularly preferably between 60° C. and 160° C. The reaction can be carried out at total pressures of between 0.001 and 20 bar. The block copolymers are worked up preferably by means of the techniques already described above for working up polyether polyols.

The block copolymers thus produced have degrees of polymerisation (based on one OH group of the highly-branched polyol used) of 1 to 70, preferably 1 to 10. The molar mass can be controlled via the monomer/initiator ratio corresponding to the anionic process. The molar mass can be determined, for example, by vapour-pressure osmosis. The polydispersities are less than 2.0 and preferably less than 1.5. They are determined by means of a GPC calibrated, for example, with polypropylene glycol standards. The products are mainly colourless oils, which may also have a pale yellow colouring. The polymers have OH values (mg KOH equivalents per g polymer) between 750 and 14, preferably between 400 and 30.

The highly-branched block copolymers thus produced are versatile highly functional polymeric intermediates. The great range of block-copolymer compositions opens up diverse possible applications, thus for example, use as cross-linking agents and additives in polyurethane formulations, in biocompatible polymers, in paints, adhesives and polymer blends, as support materials for catalysts and as active ingredients in medicine, biochemistry and synthesis, as reaction compartments for the catalysis and production of nanoparticles, a reaction compartment in this connection meaning a spatially limited reaction space in the nanometric range.

EXAMPLES

Example 1

Trimethylolpropane as Initiator 1.2 g trimethylolpropane was melted in a 250 ml glass reactor heated to 100° C. and reacted with 0.7 ml potassium methoxide solution (25% in methanol) and excess methanol was then removed under vacuum, The residue was dissolved in 15 ml dry diglyme under an inert gas (Ar). Then, at 140° C., a solution of 34 g freshly distilled glycidol in 100 ml dry TBF was added at a rate of 5 ml per hour to the reaction mixture, THF being continuously distilled off. On conclusion of the addition, the reaction mixture was dissolved in 150 ml methanol and neutralised by filtration through an acidic ion-exchange resin (Amberlite® IR-120). The filtrate was precipitated out in 1600 ml acetone and the polymer obtained was dried for 12 hours at 80° C. under vacuum. 33 g of a colourless, highly viscous liquid having a molar mass of 3,700 (degree of polymerisation 16 per active hydrogen) and a polydispersity of 1.15 was obtained. All molecules contained the initiator as the core unit and had 26% branched structural units.

Example 2

Polyethylene Glycol 600 as Initiator

As in the procedure described in Example 1, 6.0 g polyethylene glycol having a molar mass of 600 was reacted with 0.25 ml potassium monoxide solution (25% in methanol) at 100° C., excess methanol was removed under vacuum and the residue was dissolved in 10 ml dry diglyme. At a bath temperature of 140° C., 14 g glycidol in 100 ml dry THF was added at a rate of 5 ml per hour. The polymer was isolated as in Example 1. 19 g of a colourless, highly viscous liquid having a molar mass of 2,000 (degree of polymerisation 9.5 per active hydrogen) and a polydispersity of 1.13 was obtained. All molecules contained the initiator as the core unit and had 26% branched structural units.

Example 3

Stearylamine as Initiator 2.1 g stearylamine was melted in a 250 ml glass reactor heated to 100° C. and reacted with 1.2 g glycidol. Then 0.9 ml potassium methoxide solution (25% in methanol) was added and excess methanol was removed under vacuum. The residue was dissolved in 15 ml dry diglyme at 140° C. 55 g glycidol in 100 ml dry THF was added at a rate of 5 ml per hour. The polymer was isolated by a procedure similar to that in Example 1. 54 g of a colourless, highly viscous liquid having a molar mass of 7,200 (degree of polymerisation 47 per active hydrogen of the amine) and a polydispersity of 1.23 was obtained. All molecules contained the initiator as the core unit and had 27% branched structural units.

Comparison Example 4

Procedure Without Solvents, Similar to EP-A 116 978

Under the conditions and with the educts from Example 2, the polymerisation was carried out in the absence of any solvents and glycidol was added dropwise to the reaction mixture. 19 g of a yellowish, highly viscous liquid having a molar mass of 1,600 (degree of polymerisation 7 per active hydrogen) and a polydispersity of 1.84 was obtained. Only 50% of all molecules contained the initiator as the core unit.

Example 5

Production of Block Copolymer

In a 250 ml glass reactor heated to 100° C., 1.0 g of a highly-branched polyol based on glycidol, prepared by the process described in Example 1 and having a molar mass of 4,000 (corresponding to 52 OH terminal groups), was reacted with 0.1 equivalents of potassium hydride per active hydrogen atom, 50 ml propylene oxide was added in such a way that the internal temperature was maintained between 80° C. and 95° C. On conclusion of the addition, the reaction mixture was dissolved in 150 ml methanol and neutralised by filtration through an acidic ion-exchange resin (Amberlite® IR-120). The filtrate was freed from methanol and dried for 12 hours at 80° C. under vacuum. 42 g of a colourless, highly viscous liquid having a molar mass of 12,300, a polydispersity of 1.3 and an OH value of 234 mg KOH/g was obtained.

What is claimed is:

1. Polyols comprising the reaction product of (1) one or more polyols based on glycidol, and comprising the reaction product of (a) an initiator containing one or more active hydrogen atoms, with (b) glycidol, in the presence of (c) one or more solvents, and (d) a basic catalysts, wherein said polyol based on glydicol has a degree of polymerization of 1 to 300, a polydispersity of less than 1.71, and contains from 10 to 33 mol % of branched units, based on the total monomeric structural units and determined by $^{13}$C-NMR spectroscopy, with (2) one or more epoxide monomers.

2. The polyols of claim 1, wherein (2) said one or more epoxide monomers is selected from the group consisting of ethylene oxide, propylene oxide, butylene oxide, vinyl oxirane, ally glycidyl ether, isopropyl glycidyl ether, phenyl glycidyl ether and mixtures thereof.

3. The polyols of claim 1, wherein (a) said initiator containing one or more active hydrogen atoms is selected from the group consisting of trimethylolpropane, polyethylene glycol and strearylamine.

4. A process for the production of polyols, comprising (A) adding a dilute solution containing glycidol to a hydrogen-active starter compound, in the presence of a basic catalyst, (B) continuously distilling off the solvent present in the solution, thereby forming one or more polyols based on glycidol, and having a degree of polymensation of 1 to 300, a polydispersity of less than 1.7 and containing from 10 to 33 mol % of branched units, based on the total monomeric structural units and determined by $^{13}$C-NMR spectroscopy, and (C) reacting said one or more polyols based on glycidol from (B), with one or more epoxide monomers.

5. The process of claim 4, wherein the polyol based on glycidol formed in (B) has a degree of polymerisation of 5 to 80, a polydispersity of less than 1.5 and contains from 20 to 33 mol % of branched units, based on the total monomeric structural units and determined by $^{13}$C-NMR spectroscopy.

6. The process of claim 4, wherein the one or more epoxide monomers of C) is selected from the group consisting of ethylene oxide, propylene oxide, butylene oxide, vinyl oxirane, ally glycidyl ether, isopropyl glycidyl ether, phenyl glycidyl ether and mixtures thereof.

* * * * *